United States Patent [19]

Kocaoglan

[11] Patent Number: 5,059,089
[45] Date of Patent: Oct. 22, 1991

[54] INFINITELY ADJUSTABLE TRAVEL LEAD SCREW AND MULTI-CYLINDER DRIVEN MOVEMENT UNIT

[76] Inventor: Harutyun A. Kocaoglan, 804 Oakway Ct., Richardson, Tex. 75081

[21] Appl. No.: 258,594

[22] Filed: Oct. 17, 1988

[51] Int. Cl.[5] .............................................. B25J 18/04
[52] U.S. Cl. ................... 414/744.6; 414/750; 414/753; 901/17; 901/22; 901/23
[58] Field of Search ............... 414/744.6, 750–753; 901/17, 22, 23, 24

[56] References Cited

U.S. PATENT DOCUMENTS

| 3,840,128 | 10/1974 | Swoboda et al. | 901/22 X |
| 3,888,360 | 6/1975 | Ando et al. | 901/22 X |
| 4,379,335 | 4/1983 | Kirsch et al. | 901/22 X |
| 4,489,624 | 12/1984 | Schaib et al. | 901/22 X |
| 4,526,654 | 7/1985 | Johansson et al. | 414/753 X |
| 4,543,638 | 9/1985 | Scarffe | 901/22 |
| 4,616,745 | 10/1986 | Hartness | 198/442 |
| 4,662,813 | 5/1987 | Hartman | 901/22 X |

FOREIGN PATENT DOCUMENTS

| 611773 | 5/1978 | U.S.S.R. | 901/22 |
| 722757 | 3/1980 | U.S.S.R. | 901/22 |

Primary Examiner—Robert J. Spar
Assistant Examiner—Donald W. Underwood
Attorney, Agent, or Firm—Warren H. Kintzinger

[57] ABSTRACT

A multi-cylinder and short lead screw driven travel arm or machinery movement unit achieving infinitely variable travel through the design limits of travel imposed thereon. In one working configuration using 1", 2", 4" and 8" travel pneumatic cylinders and a 1" travel screw together yield a sixteen inch travel range with an infinite range of fully programmable settings through selected activation of cylinders along with the selected vernier setting of the 1" threaded travel screw. The travel range of settings may be increased even further by adding additional travel cylinders and increased length travel guide structure adequate for such increased travel range of settings, for example, addition of a 5" travel cylinder extends the range of settings to a maximum of twenty one inches.

12 Claims, 2 Drawing Sheets

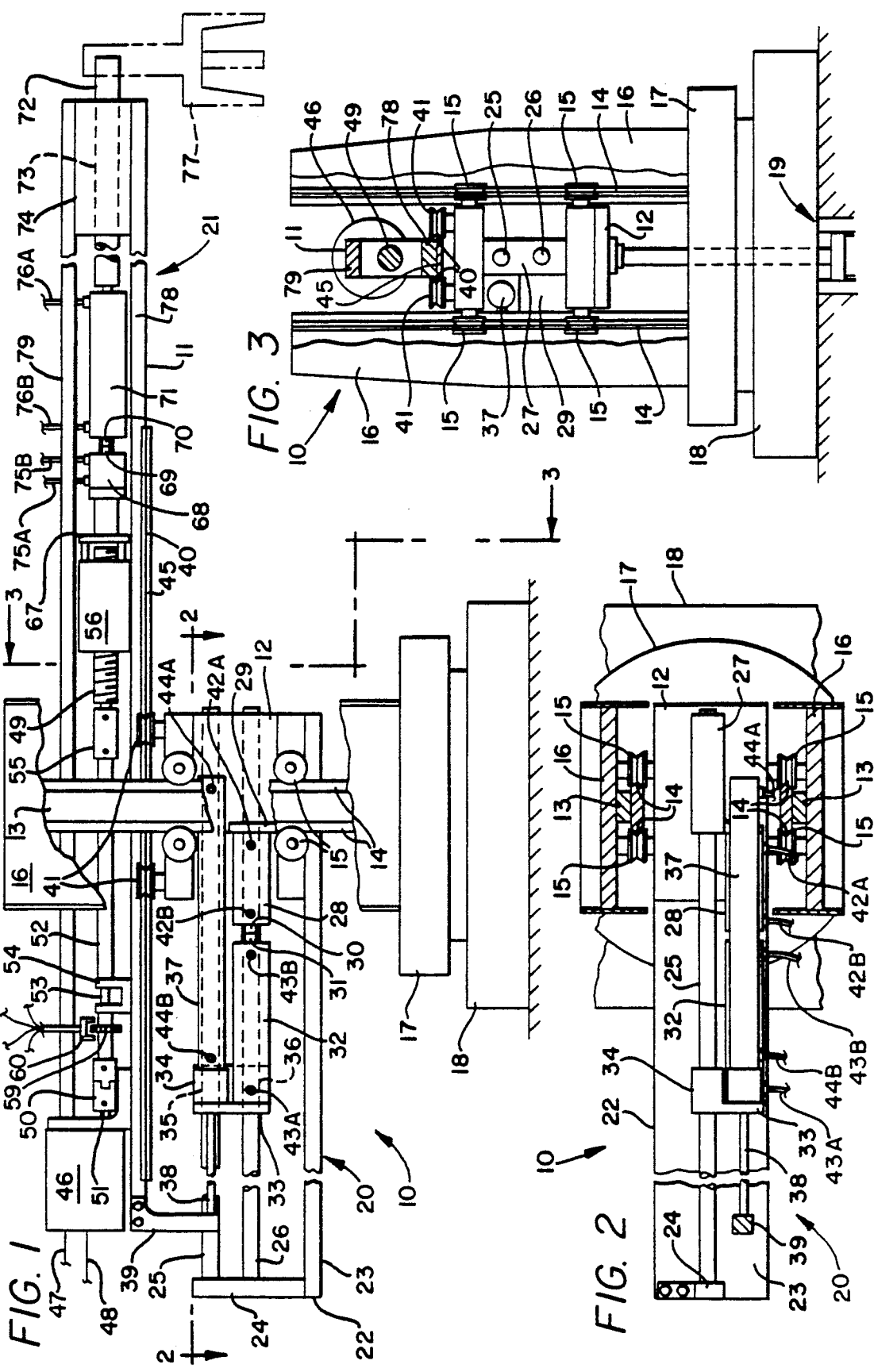

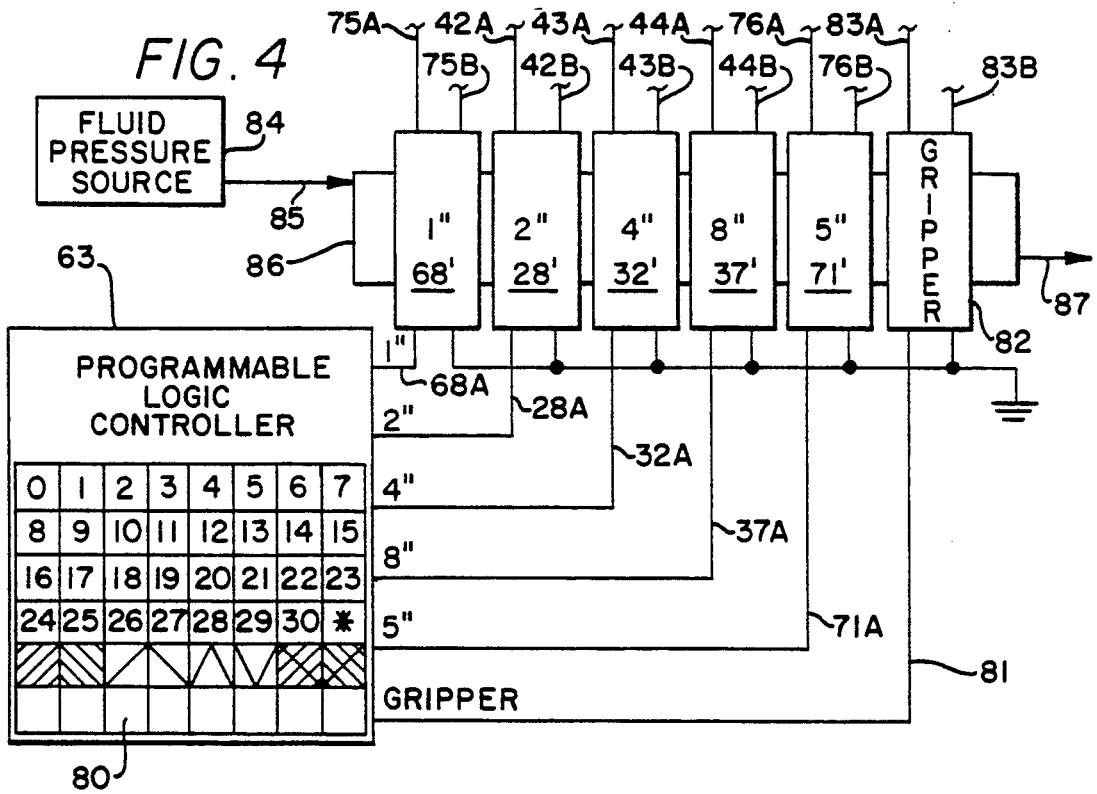
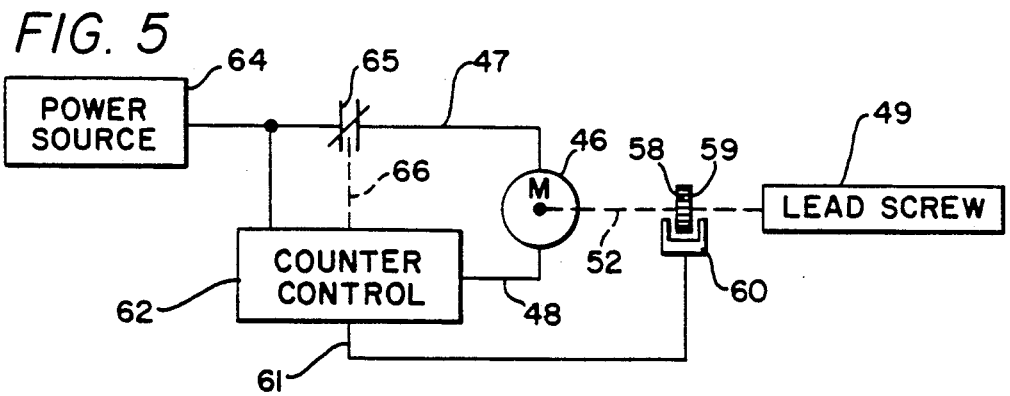
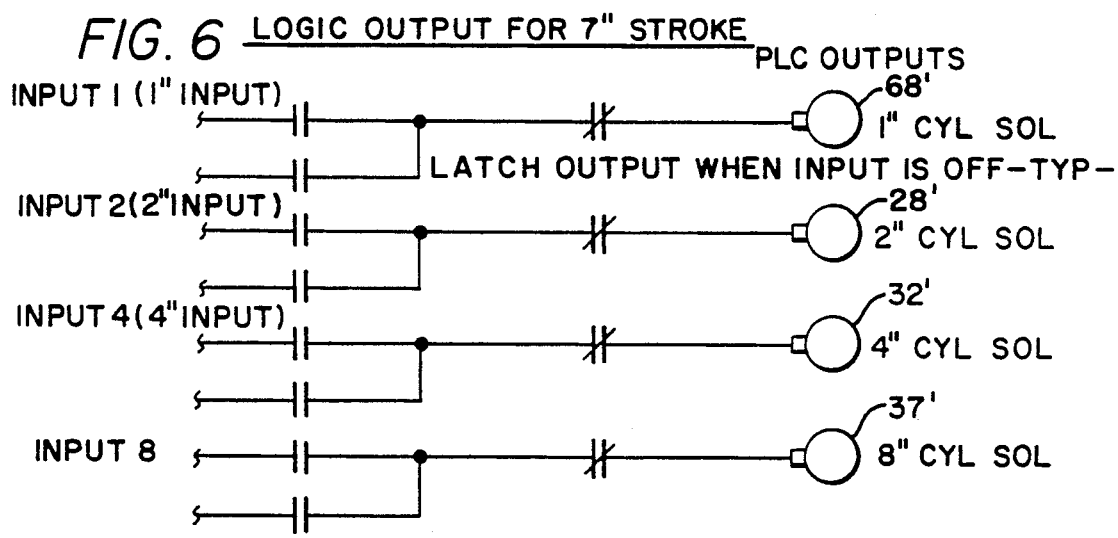

INFINITELY ADJUSTABLE TRAVEL LEAD SCREW AND MULTI-CYLINDER DRIVEN MOVEMENT UNIT

This invention relates in general to robot arms, manipulators and industrial position indexing machinery, and more particularly, to a multi-cylinder driven travel member (or arm) also including a short lead screw enabling vernier settings through the entire range of settings of the travel member.

Many robot arms, manipulators and industrial position moving devices are power driven and continue to exert pressure on an object being moved and positioned many times extending through a desired position and beyond. Further, many times it takes considerable time for a robot arm and other machinery moving and positioning devices to drive an article being moved to a desired position and even then the position ultimately arrived at is, in many instances, non-precise. It would be very useful to have a computer precise position control programmed structure that would drive a positioning arm or article positioning carriage to a desired position with great accuracy quickly with driving power maintained using pneumatic or hydraulic cylinders.

It is therefor a principal object of this invention to provide a fast acting computer controlled positioning structure with drive to to the desired position.

Another object is to provide such a positioning structure that achieves high positioning accuracy through an infinitely variable position range between travel limits.

A further object is to provide such a positioning structure having excellent reliability in use with minimal maintenance and service requirements.

Still another object is to provide such a positioning structure having simultaneous drive to a plurality of elements actuation activated to a computer control set position for high speed positioning control.

Features of the invention useful in accomplishing the above objects include in a multi-cylinder driven travel arm having a short lead screw for highly accurate vernier set infinite positions through position travel limits, a multi-cylinder and short lead screw driven travel arm or machinery movement unit achieving infinitely variable travel through the design limits of travel imposed thereon. A principal working configuration using 1", 2", 4", and 8" travel pneumatic cylinders and a 1" travel screw together yields a sixteen inch travel range with an infinite range of fully programmable settings through selected activation of cylinders along with the selected vernier setting of the 1" threaded travel screw. It is a movement position unit where the travel range of settings may be increased even further by adding additional travel cylinders and increased length travel guide structure adequate for such increased travel range of settings. The travel power cylinders are generally hydraulic or pneumatic although a combination of such power travel sections in different lengths could be used in place of solely one or the other.

A specific embodiment representing what is presently regarded as the best mode of carrying out the invention is illustrated in the accompanying drawings.

In the drawings:

FIG. 1 represents a side elevation view of a multi-cylinder and short lead screw driven travel arm mounted on a vertical rail mounted carriage above a rotatable mounting base;

FIG. 2, a partially cut away and sectioned vertical plan view of lower tier power cylinders of various stroke lengths and vertical movement carriage detail taken from line 2—2 of FIG. 1;

FIG. 3, a partially cut away and sectioned elevation view taken from line 3—3 of FIG. 1;

FIG. 4, a block schematic showing of a programmable logic controller with 1, 2, 4 and 8 inch stroke signal outputs out of the programmable logic controller and a signal output five inch stroke extended range connection for greater range to respective solenoid valves;

FIG. 5, the lead screw and counter position control block schematic diagram; and FIG. 6, a cylinder solenoid valve control circuit schematic.

Referring to the drawings:

The travel arm unit 10 of FIGS. 1, 2 and 3 is shown to have the travel arm 11 mounted on a vertical movement carriage 12 vertically moveable along vertical guide rail 13 inverted "V" shaped tracks 14 that act as a guide for carriage "V" grooved wheels 15. The vertical guide rail 13 structure 16 is mounted to extend vertically from and above 360° turntable plate 17 on 360° rotation drive structure 18 through which a power ram assembly 19 mounted on the structure 18 drive positions the vertical movement carriage 12 as desired. The opposite side guide rails 13 have inverted "V" shaped tracks 14 on opposite edges thereof to guide four "V" grooved wheels 15 on each side of the vertical movement carriage 12.

The travel arm unit 10 has a lower power stroke drive section 20 and an upper power stroke drive section 21 both interconnected to drive the travel arm 11 outward and back through an infinite number of length settings through its overall range of travel between limits. Both the lower and upper power stroke drive sections 20 and 21 are mounted on the vertical movement carriage 12 with lower section 20 having a frame 22 including a bottom plank member 23 fixed to the bottom of the carriage 12 and extended to an end plate 24 that mounts the outer ends of guide rods 25 and 26 that are mounted at their inner ends in carriage block 27. A two inch stroke cylinder 28 has its rear end connected to a carriage plate 29 and its output movement rod 30 coupled to the output movement rod 31 of four inch stroke cylinder 32 having a rear end mounting connection with flange 33 of slide block 34. Block 34 has bushing openings 35 and 36 through which guide rods 25 and 26 slidably move when any one or both cylinders 28 and 32 are powered for movement. Cylinder 37 is mounted on flange 33 for the piston rod 38 to push or pull the bracket 39 of the upper power stroke drive section 21 with opposite side "V" rails 40 running through the four inverted "V" wheels 41 rotatably mounted on the top of the vertical movement carriage 12. The opposite side "V" rails 40 are long enough and so positioned on the upper drive section 21 as to accomodate the full fourteen inch range of movement contributed to the travel arm 11 by the travel cylinders 28, 32 and 37 of lower power stroke drive section 20. The travel cylinders 28, 32 and 37 are double action cylinders with fluid media pressure lines 42A and 42B connected to opposite ends of cylinder 28, 43A and 43B to opposite ends of cylinder 32, and 44A and 44B to opposite ends of cylinder 37 for operation of the cylinders in one direction or the other in moving the bracket 39 and thereby the upper power stroke section 21 of the travel arm unit 10. The "V" rail 40 support member 45 is part of and supports upper power stroke drive section 21 that mounts a lead screw drive motor 46 having power leads 47 and 48 and a one inch threaded screw 49 drive connected to motor 46. A drive coupling 50 interconnects the drive output 51 of motor 46 to a drive shaft 52 having a reduced diameter portion 53 supported by bracket 54 and a coupling 55 to lead screw 49 that is threaded through travel block 56 with a selected travel stroke back and forth between limits of one inch with the direction of travel determined by the direction of travel determined by the direction of motor 46 and lead screw 49 rotation. Referring also to FIG. 5 a serrated 58 wheel 59 is mounted on drive shaft 52 for a radiation and sensor device 60 count indicating wheel rotation positions with drive power and signal feed back through a four line cable 61 to counter control 62 that is a part of programmable logic controller 63. The counter control 62 that is connected to a power source 64 connected through switch 65 to drive motor 46 has a switch drive 66 opening and closing switch 65. The output end of threaded travel block 56 has a connection 67 with the back end of a one inch stroke drive cylinder 68 that is shown to have its output movement rod 69 coupled to the output movement rod 70 of five inch stroke drive cylinder 71. Drive cylinder 71 is connected at the arm output end to outer end plunger 72 that as driven by the various drive stroke units of the system slides back and forth through opening 73 through support block 74. Travel cylinders 68 and 71 are double action cylinders with fluid media pressure lines 75A and 75B connected to opposite ends of cylinder 68, and 76A and 76B to opposite ends of cylinder 71 for operation of the cylinders in one direction or the other in moving outer end plunger 72 for positioning a pickup manipulating device 77 or other utility device that may be mounted on the outer end of plunger 72 in place of the device 77 mounted thereon. The power stroke drive elements and drive train of upper power section 21 are supported by and protected between lower and upper support bars 78 and 79, respectively.

Referring also to FIG. 4 the programmable logic controller 63 has a data entry keyboard 80 and may be programmed for a sequential series of positioning operations in completing a desired task. Output lines 68A, 28A, 32A, 37A and 71A would be activated and deactivated in accord with programmed functions for the activation and deactivation of solinoids 68', 28', 32', 37' and 71' and also activation and deactivation, via control line 81, of the gripper solenoid 82 for application of fluid pressure selectively through lines 83A and 83B with pressure in line 83A making the gripper 77 grab and pressure in line 83B making the gripper 77 release. Each of the solenoids has a connection to ground and the solenoids 68', 28', 32', 37' and 71' when not activated connect lines 75B, 42B, 43B, 44B and 76B to fluid pressure source 84 through line 85 and a fluid pressure chamber within manifold block 86 to activate the respective cylinders to the retracted state. When the A lines are activated the respective cylinders are activated in a power drive stroke to incrementally extend the travel arm 11. A and B lines drain to a fluid drain chamber within manifold block 86 and out line 87 as exhaust if the cylinders are pneumatic cylinders and if hydraulic cylinders are being used in a hydraulic drive system then through line 87 as a liquid return line to the hydraulic liquid supply to the hydraulic pressure system employed.

Thus there is hereby provided an infinitely variable travel fully programmable arm or manipulator achieving quick travel to programmed states of extension within the limits of its travel by using cylinders and a short lead screw. Hydraulic and pneumatic cylinders are well known in industrial machinery circles and easy to maintain and control. The basic system includes one inch stroke cylinder 68, a two inch stroke cylinder 28, a four inch stroke cylinder 32, and an eight inch stroke cylinder 37 along with one inch travel lead screw 49 provide a sixteen inch range of travel between limits that is extendable further by an additional five inch stroke cylinder 71 to provide a twenty one inch range of travel. Other length stroke cylinders, with stroke length in inches and even in odd lengths, may be added to provide extended travel limits in an arm structure with the lead screw giving fine increment one inch travel to incrementally fill the gap between successive one inch cylinder total travel steps with various combinations of cylinders powered for extension. Consider an example: with a program command to travel seven inches one inch stroke cylinder 68, two inch stroke cylinder 28 and four inch stroke cylinder 32 are activated to the extended state. With a program command to travel 11.370 inches one inch stroke cylinder 28, two inch stroke cylinder 28 and eight one inch stroke cylinder 37 are activated to the extended state and the lead screw 49 is rotated by the motor 46 driving the threaded through travel block 56 for 0.370 inches of slide travel. It should be noted that the travel of the various activated cylinders and the lead screw can be simultaenous or one at a time. In another example with a program command for 16.000 inches of arm travel cylinders 68 (one inch), 28 (two inch), 37 (eight inch) and 71 (five inch) are activated. If an additional fraction of an inch of travel were needed the lead screw would be driven to slide travel block 56 to a program commanded fraction of an inch degree of travel. Further, a lead screw and slider block structure could be included having a stroke length equal to the stroke length of two of the cylinders added together.

FIG. 6 is a ladder diagram control schematic for a sample seven inch driven arm stroke. Thereafter a reset signal cancels the output when the output is latched.

Please note that the power ram assembly 19 could also incorporate a plurality of difficult stroke cylinders and even a fine position control lead screw assembly similar to the stroke elements described in its power drive for heighth setting also controlled by programmable logic controller 63. The 360° rotation drive structure 18 rotationally positions turntable plate 17 and thereby the travel arm 11 of arm unit 10 as controlled by programmable logic controller 63.

Whereas this invention has been described with respect to several embodiments thereof, it should be realized that various changes may be made without departing from the essential contributions to the art made by the teachings hereof.

I claim:

1. A multi-cylinder driven movement unit comprising: a first cylinder means having a unitary length drive stroke; a second cylinder means having a drive stroke twice the length of said first cylinder means drive stroke unitary length; a third cylinder means with a drive stroke four times the drive stroke of said first cylinder means; with said cylinders by activation singularly and in combinations providing drive of said driven movement unit in steps of one, two, three, four, five, six and seven unitary length settings in the cylinder drive determined position of said driven movement unit; a lead screw is included along with an internally threaded slider block means mating said lead screw and driven back and forth by said lead screw dependent on the rotational drive direction the lead screw is driven through a stroke of unitary length between travel limits equal in length to the unitary length drive stroke of said first cylinder; and support and guide means for said lead screw driven slider block means; a drive motor including a drive connection is mounted on said support and guide means for said lead screw; all said cylinder means are double acting cylinders power activated alternatively in both directions subject to fluid pressure being applied to one or the other of the two chambers of the respective cylinders and the other chamber opened to relieve pressure; valve means is connected for selectively feeding fluid pressure to one or the other of the two chambers of the respective cylinders and opening the other of the two chambers to relieve pressure; said valve means is a plurality of solenoid valves one for each of said cylinders; programmable logic controller means is connected to said plurality of solenoid valves for selective programmed control of said movement unit; a power source controlled by said programmable logic control is connected to said drive motor; rotation sensing means is mounted on the drive connection to said lead screw; and signal pickup and transmitting means is connected to control means having a switch control output for switch-off of power to said drive motor upon said lead screw having been rotated to a programmed position for finely determined controlled positioning of said slider block means; said movement unit is mounted on a vertically moveable carriage means; drive means for vertically positioning said carriage means; vertically extended mount and guide means positioned on a rotatable base for vertically guiding said carriage means; and drive means for rotating said rotatable base; and wherein said movement unit has a first section and a second section; a plurality of said cylinders on said second section connected for moving said first section through a range of travel; rail guide and mount means on said first section mounted on said carriage means; and said rail guide and mount means being of sufficient length to accomodate the full range of travel of the said first section.

2. The multi-cylinder driven movement unit of claim 1, wherein a fourth cylinder means is also included with a drive stroke eight times the drive stroke of said first cylinder.

3. The multi-cylinder driven movement unit of claim 2, including at least one additional cylinder having a stroke length a multiple of said first cylinder drive stroke unitary length.

4. The multi-cylinder and lead screw drive movement unit of claim 1, wherein an outer plunger having an outer end is part of said movement unit; and a power driven utility device is mounted on the outer end of said plunger.

5. The multi-cylinder and lead screw drive movement unit of claim 4, wherein said power driven utility device is a three pronged gripper having cylinder drive for gripping connected through solenoid valve means connected for computer program control.

6. The multi-cylinder and lead screw drive movement unit of claim 5, wherein said power driven utility device is also of the type having a rotational drive motor connected for computer programmed on-off control.

7. The multi-cylinder and lead screw drive movement unit of claim 1, wherein the stroke of unitary length of the lead screw driven slider block means and of said first cylinder is a drive stroke of one inch.

8. The multi-cylinder driven movement unit of claim 2, wherein with said fourth cylinder means there are eight additional unitary length position settings in cylinder drive determined position of said driven movement unit.

9. The multi-cylinder driven movement unit of claim 1, wherein said first section is an upper section; said second section is a lower section.

10. The multi-cylinder driven movement unit of claim 9, wherein said first section is mounted on a plurality of "V" grooved mounting wheels mounted on the top of said carriage means.

11. A multi-cylinder movement unit comprising: a plurality of cylinders including a unitary length cylinder and additional cylinders that are multiple lengths thereof in the length order, respectively, of 2, 3, 4, 8 times, substantially, of the unitary length; said plurality of cylinders being fluid power cylinders selectively activated singularly or in any combination to complete extension or retraction to give unitary length settings to 1, 2, 3, 4, 5, 6, 7, 8, 9, 10, 11, 12, 13, 14 and 15; power output movement means interconnecting said fluid power cylinders for movement of a movement end of said multi-cylinder movement unit to any unitary length setting from a zero setting to a 15 unitary length setting; fluid power source and multiple valve means; and control means for selectively activating said multiple valve means for complete extension or retraction of the fluid power cylinders activated; also including lead screw means with a lead screw and driven means drivable back and forth by said lead screw dependent on the rotational drive direction the lead screw is driven through a stroke of unitary length between travel limits equal in length to the drive length of the unitary length cylinder; and wherein a drive motor is drive connected to said lead screw means and control line means connected to said control means.

12. The multi-cylinder movement unit of claim 11, wherein said control means for selectively activating said multiple value means is an open loop control system without signal feedback from said plurality of cylinders to said control means.

* * * * *